(12) United States Patent
Parikh et al.

(10) Patent No.: US 11,331,608 B2
(45) Date of Patent: *May 17, 2022

(54) SYSTEMS AND METHODS FOR ATTACHING AND RETAINING A FILTER ELEMENT ON A ROTATING SHAFT

(71) Applicant: Cummins Filtration IP, Inc., Columbus, IN (US)

(72) Inventors: Chirag D. Parikh, Madison, WI (US); Christopher E. Holm, Madison, WI (US); Bradley A. Smith, Columbus, IN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/938,422

(22) Filed: Jul. 24, 2020

(65) Prior Publication Data

US 2020/0353396 A1 Nov. 12, 2020

Related U.S. Application Data

(63) Continuation of application No. 15/752,145, filed as application No. PCT/US2016/049002 on Aug. 26, 2016, now Pat. No. 10,744,438.

(Continued)

(51) Int. Cl.
*B01D 46/00* (2022.01)
*B01D 46/26* (2006.01)
(Continued)

(52) U.S. Cl.
CPC ......... *B01D 46/0004* (2013.01); *B01D 45/14* (2013.01); *B01D 46/003* (2013.01);
(Continued)

(58) Field of Classification Search
CPC .............. B01D 46/009; B01D 46/0004; B01D 46/003; B01D 46/26; B01D 46/0056;
(Continued)

(56) References Cited

U.S. PATENT DOCUMENTS

| 4,975,188 A | 12/1990 | Brunsell et al. |
| 8,974,567 B2 | 3/2015 | Verdegan et al. |

(Continued)

FOREIGN PATENT DOCUMENTS

| CN | 201554994 U | 8/2010 |
| CN | 102494041 A | 6/2012 |

(Continued)

OTHER PUBLICATIONS

Foreign Action other than Search Report on CN 201680048443.5 dated Sep. 25, 2019.

(Continued)

*Primary Examiner* — Minh Chau T Pham
(74) *Attorney, Agent, or Firm* — Foley & Lardner LLP

(57) ABSTRACT

An attachment and retaining mechanism is described for removably attaching a rotating filter element to a rotating shaft. The rotating filter element includes a filter media that is driven by a drive mechanism that rotates the rotating shaft. The filter element is removably attached to the rotating shaft such that the filter element and filtration system can be periodically replaced and/or serviced. In some arrangements, the drive shaft includes a D-shaped section that interacts with a mating section of the filter element sleeve of the rotating filter element. In other arrangements, the drive shaft includes at least one flat drive surface.

20 Claims, 13 Drawing Sheets

Related U.S. Application Data

(60) Provisional application No. 62/211,505, filed on Aug. 28, 2015.

(51) Int. Cl.
| | | |
|---|---|---|
| *B01D 45/14* | (2006.01) | |
| *F01M 13/04* | (2006.01) | |
| *B01D 46/24* | (2006.01) | |
| *F01M 11/03* | (2006.01) | |
| *F01M 13/00* | (2006.01) | |

(52) U.S. Cl.
CPC ....... *B01D 46/009* (2013.01); *B01D 46/0056* (2013.01); *B01D 46/2411* (2013.01); *B01D 46/26* (2013.01); *F01M 11/03* (2013.01); *F01M 13/00* (2013.01); *F01M 13/04* (2013.01); *F01M 2011/038* (2013.01); *F01M 2013/0422* (2013.01); *F01M 2013/0438* (2013.01)

(58) Field of Classification Search
CPC .... B01D 46/2411; B01D 45/14; F01M 13/00; F01M 13/04; F01M 11/03; F01M 2013/0438; F01M 2011/038; F01M 2013/0422
USPC ..... 55/400, 401, DIG. 19; 123/41.86, 196 A, 123/193 E See application file for complete search history.

(56) References Cited

U.S. PATENT DOCUMENTS

| | | | |
|---|---|---|---|
| 10,744,438 B2 * | 8/2020 | Parikh | B01D 46/009 |
| 2002/0144937 A1 | 10/2002 | Wilberscheid et al. | |
| 2003/0116496 A1 * | 6/2003 | Schepis | B01D 33/48 |
| | | | 210/331 |
| 2011/0252974 A1 * | 10/2011 | Verdegan | F01M 13/04 |
| | | | 96/178 |
| 2014/0027366 A1 | 1/2014 | Hawkins et al. | |

FOREIGN PATENT DOCUMENTS

| | | |
|---|---|---|
| CN | 204121188 U | 1/2015 |
| CN | 204451950 U | 7/2015 |
| CN | 104863665 A | 8/2015 |

OTHER PUBLICATIONS

International Search Report and Written Opinion issued for PCT Application No. PCT/US2016/049002, dated Nov. 15, 2016, 8 pages.

* cited by examiner

SYSTEMS AND METHODS FOR ATTACHING AND RETAINING A FILTER ELEMENT ON A ROTATING SHAFT

CROSS-REFERENCE TO RELATED APPLICATIONS

This application is a continuation of U.S. patent application Ser. No. 15/752,145, filed Feb. 12, 2018, now U.S. Pat. No. 10,744,438, which is a national stage of PCT Application No. PCT/US2016/049002, filed Aug. 26, 2016, which claims priority to U.S. Provisional Patent Application No. 62/211,505, entitled "SYSTEMS AND METHODS FOR ATTACHING AND RETAINING A FILTER ELEMENT ON A ROTATING SHAFT," filed Aug. 28, 2015. The contents of these applications are hereby incorporated by reference in their entirety.

TECHNICAL FIELD

The present application relates to rotating filter elements.

BACKGROUND

During operation of an internal combustion engine, a fraction of combustion gases can flow out of the combustion cylinder and into the crankcase of the engine. These gases are often called "blowby" gases. The blowby gases include a mixture of aerosols, oils, and air. If vented directly to the ambient, the blowby gases can harm the environment. Accordingly, the blowby gases are typically routed out of the crankcase via a crankcase ventilation system. The crankcase ventilation system may pass the blowby gases through a coalescer (i.e., a coalescing filter element) to remove a majority of the aerosols and oils contained in the blowby gases. The coalescer includes filter media. The filtered blowby gases are then either vented to the ambient (in open crankcase ventilation systems) or routed back to the air intake for the internal combustion engine for further combustion (in closed crankcase ventilation systems).

Some crankcase ventilation systems utilize rotating coalescers that increase the filter efficiency of the coalescing filter elements by rotating the filter media during filtering. In rotating filter cartridges, the contaminants (e.g., oil droplets suspended and transported by blowby gases) are separated inside the filter media of the filter cartridge through the particle capture mechanisms of inertial impaction, interception, diffusion, and gravitational forces onto the fibers. By rotating the filter media, inertial impaction and gravitational forces are enhanced by the additional centrifugal force. Additionally, the rotation of the filter cartridge can create a pumping effect, which reduces the pressure drop through the filtration system. Rotating filter cartridges may include fibrous filters as well as centrifugal separation devices.

The rotating filter elements need to be periodically serviced and replaced. Accordingly, the rotating filter elements need to be removably attached and retained on a drive shaft. When the filter element is installed on the drive shaft, the drive shaft imparts rotation on the filter element during filtering operations. When the filter element is removed from the drive shaft, it can be serviced and reinstalled onto the drive shaft, or a new filter element can be installed onto the drive shaft.

SUMMARY

One example embodiments relate to a filtration system. The filtration system includes a housing having an inlet and an outlet. The filtration system includes a drive mechanism including a drive shaft with a flat section. The filtration system further includes a rotating filter element that is positioned within the housing and in fluid communication with the inlet and the outlet. The rotating filter element is configured to separate a suspended liquid from a fluid received through the inlet. The rotating filter element includes a first endplate, a second endplate, and filter media positioned between the first endplate and the second endplate. The rotating filter element further includes a filter element sleeve or bushing configured to receive the drive shaft. The filter element sleeve or bushing has a projection that projects radially inward. The projection interacts with the flat section of the rotating shaft so as to transfer rotation from the rotating shaft to the rotating filter element.

Another example embodiment relates to a rotating filter element. The rotating filter element includes a first endplate, a second endplate, and filter media positioned between the first endplate and the second endplate. The rotating filter element further includes a filter element sleeve or bushing configured to receive a drive shaft of a filtration system when the rotating filter element is installed in the filtration system. The filter element sleeve or bushing includes a projection that projects radially inward. The projection interacts with a rotating shaft of the filtration system so as to transfer rotation from the rotating shaft to the rotating filter element. The rotating filter element is configured to separate a suspended liquid from a fluid.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, an attachment and retaining mechanism is described for removably attaching a rotating filter element to a drive shaft. The rotating filter element includes a filter media that is driven by a drive mechanism that rotates the drive shaft. The filter element is removably attached to the drive shaft such that the filter element and filtration system can be periodically replaced and/or serviced. According to various embodiments, the drive shaft includes a flat section that interacts with a mating section or projection of the filter element sleeve or bushing of the rotating filter element. The filter element sleeve receives the flat section of the drive shaft and provides surface contact between the rotating drive shaft and the filter element sleeve while reducing possible wear and permitting assembly and removal of the rotating filter element. The filter element sleeve or bushing includes a relief section in the root radius region of the radial projection that reduces the wear on the sleeve or bushing by promoting surface contact between the rotating drive shaft flat section and the flat face of the radial projection. In some arrangements, the flat section of the drive shaft includes a chamfered or rounded edge that provides the relief or clearance between the drive shaft flat edges and the root radius of the sleeve or bushing projection.

The filter element can be removed from and installed over the drive shaft without the use of a special tool. An o-ring can be installed between the drive shaft and the filter element sleeve to prevent the filter element from falling off of the drive shaft due to gravity and to prevent gases from bypassing the filter element through the clearance between the drive shaft and the bushing or sleeve. The o-ring is compressed such that the o-ring allows the drive shaft to expand thermally during thermal cycling without loading the bearings axially. After the filter element is installed, a clearance fit is formed between the drive shaft and an inner race of the bottom filter bearing.

Figure 1:
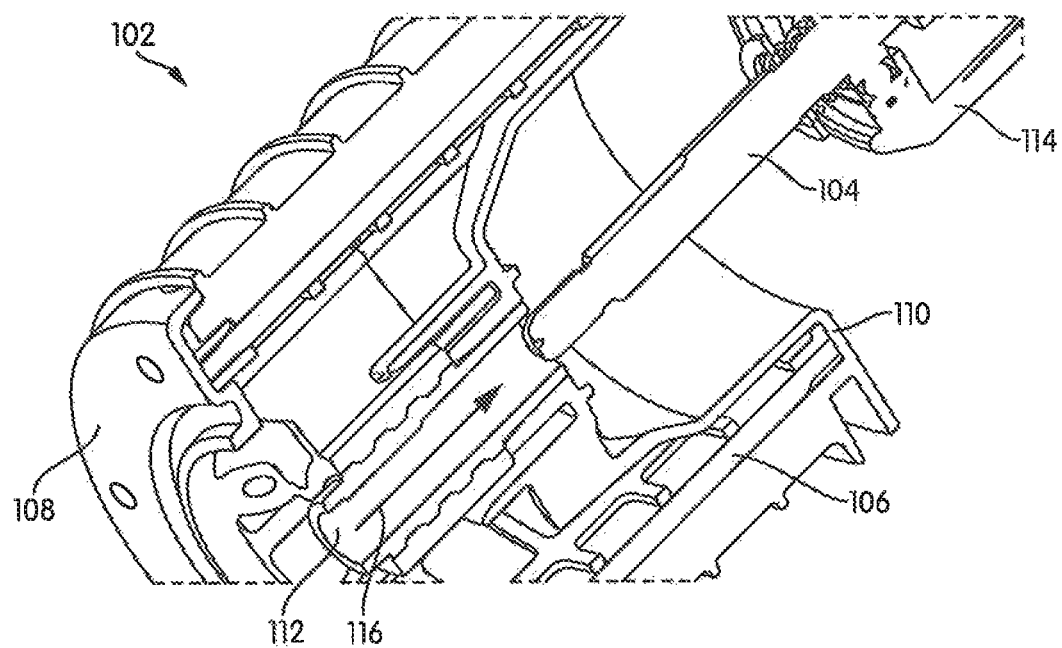
FIGS. 1 and 2 show cross-sectional views of a filter element being installed over a drive shaft and being secured to the drive shaft according to an example embodiment.

Referring to FIG. 1, a cross-sectional view of a filter element 102 being installed over a drive shaft 104 is shown. The filter element 102 includes filter media 106 arranged between first and second endcaps 108 and 110. The filter element 102 includes a filter element sleeve 112 that is configured to receive and surround the drive shaft 104. In some arrangements, the filter element sleeve 112 is a bushing. The drive shaft 104 is rotated by a drive mechanism, such as an electric motor 114. During installation, the filter element 102 is inserted over the drive shaft 104 in the direction of arrow 116.

Figure 2:
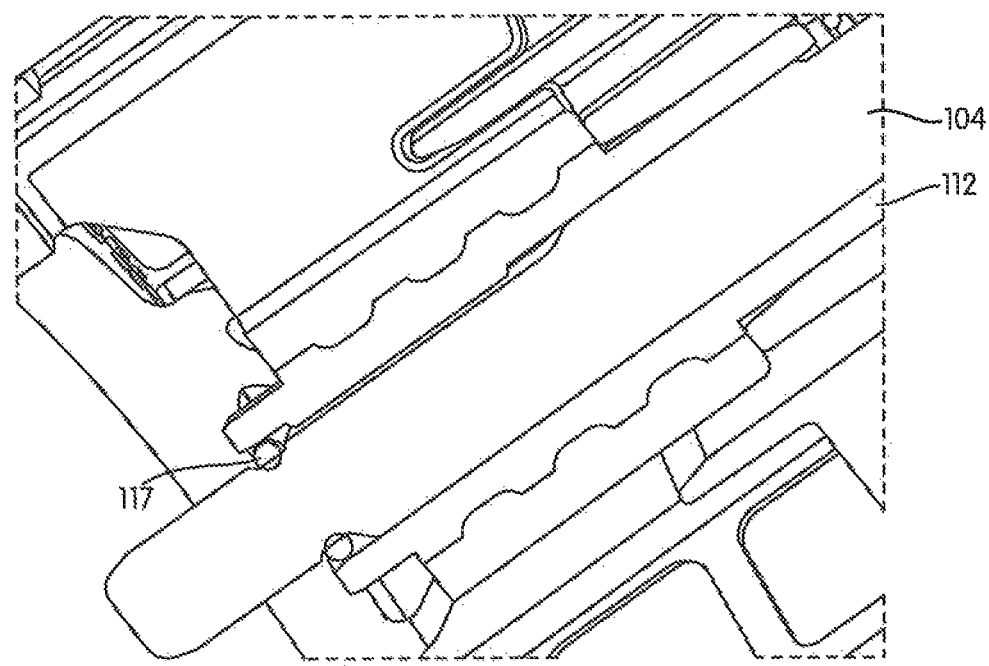

Referring to FIG. 2, a cross-sectional view of the filter element installed over the drive shaft 104 is shown. As shown, drive shaft 104 may be fitted with an o-ring 117. The o-ring 117 prevents the filter element 102 from falling off of the drive shaft 104 due to gravity and to prevent gases from bypassing the filter element 102. The o-ring 117 is compressed such that the o-ring 117 allows the drive shaft 104 to expand under thermal expansion during thermal cycling without loading the bearings axially. In some arrangements, the o-ring 117 is replaced with a retaining snap ring, which provides a stronger holding force that holds the filter element 102 axially on the drive shaft 104 than the o-ring 117.

Figure 3:
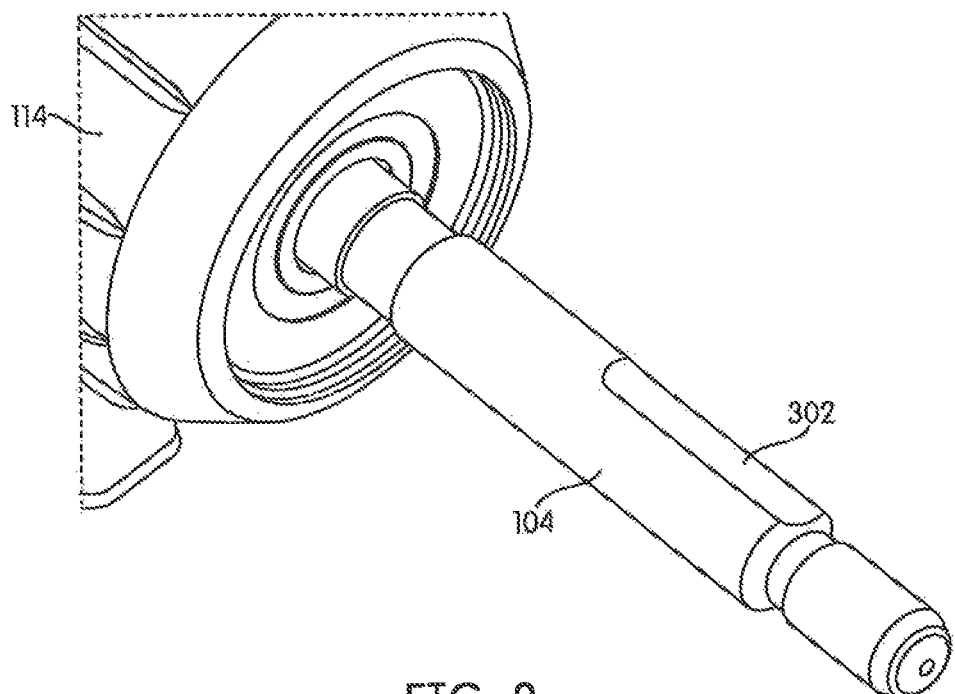
FIGS. 3 through 10 show various views demonstrating how the rotating filter element of FIGS. 1 and 2 is installed onto and interacts with the rotating shaft of FIGS. 1 and 2.

FIG. 3 is a perspective view of the drive shaft 104. The drive shaft 104 includes a flat section 302. In some arrangements, the flat section 302 provides a portion of the drive shaft 104 with a D-shaped cross-sectional profile. As described in further detail below, the flat section 302 provides a drive surface that interacts with a mating surface of the filter element sleeve 112 to impart rotation from the drive shaft 104 to the filter element 102 (e.g., as shown in FIGS. 5 and 6).

Figure 4:
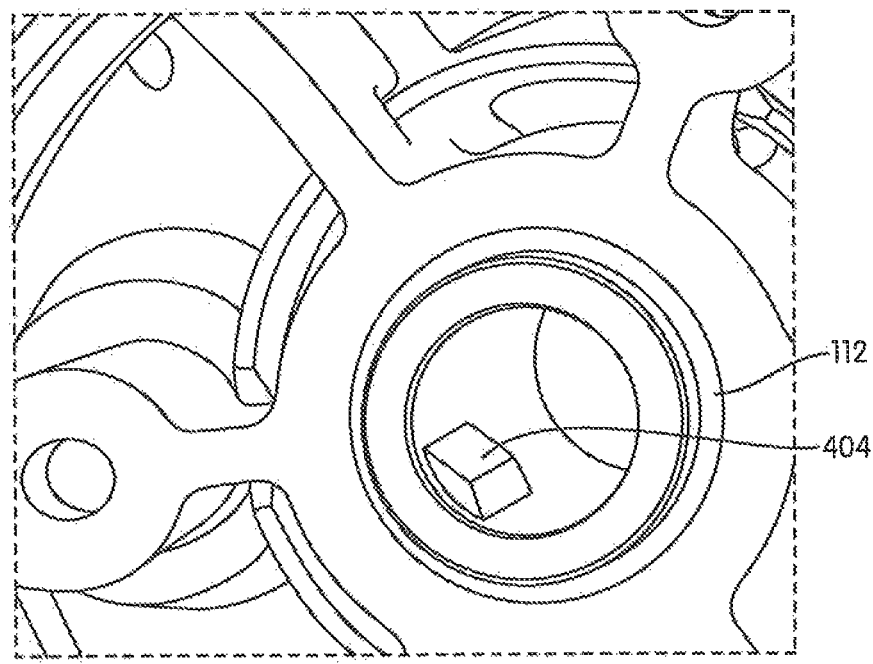

Referring to FIG. 4, a perspective view of the filter element sleeve 112 is shown. The filter element sleeve 112 includes a sleeve projection 404. The sleeve projection 404 is a radially inward projecting bump that interacts with the flat section 302 of the drive shaft 104 to transfer rotation from the drive shaft 104 to the filter element 102 (e.g., as shown in FIGS. 5,6, and 10).

Figure 5:
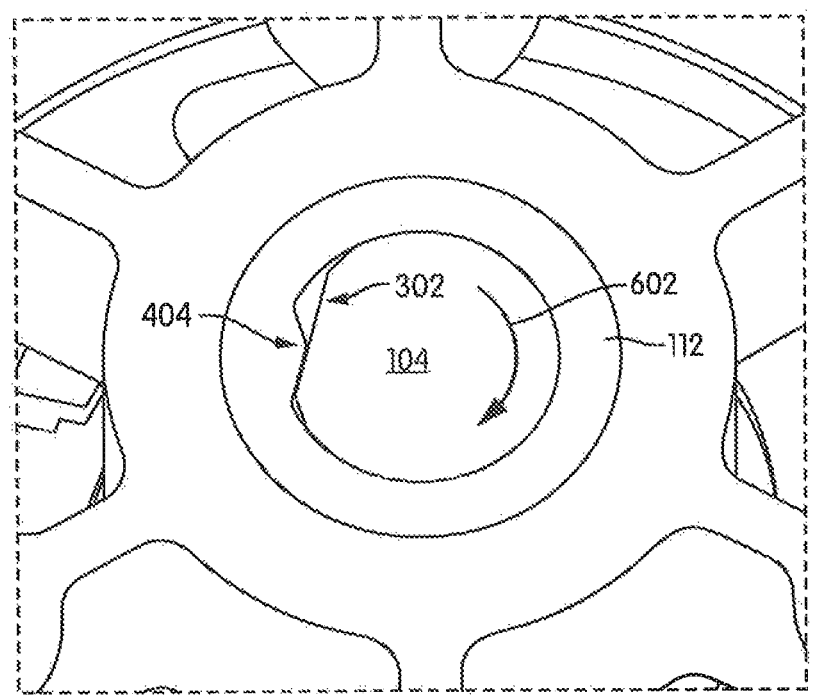
Figure 6:
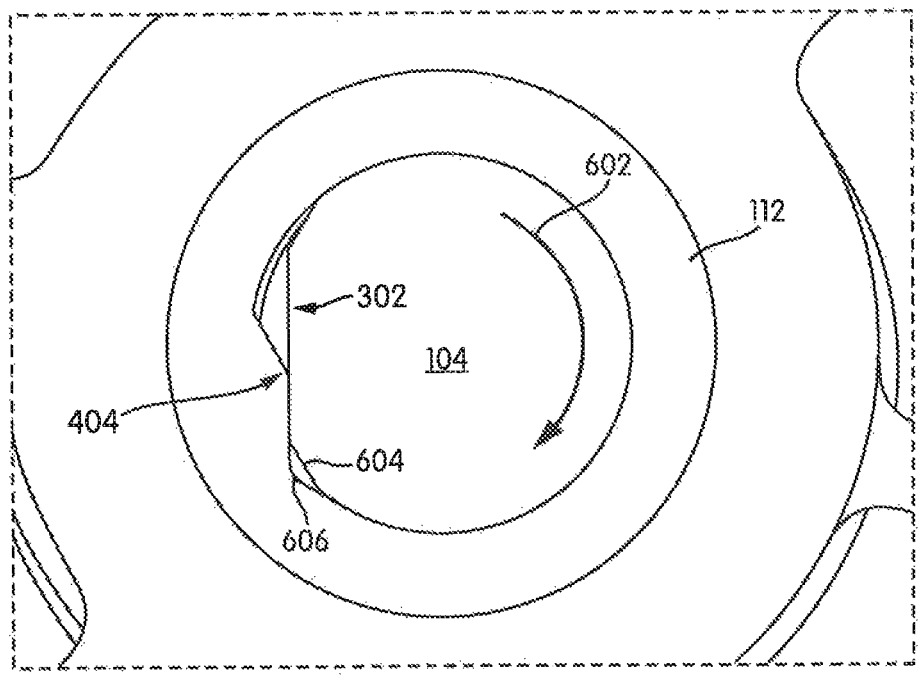
Figure 9:
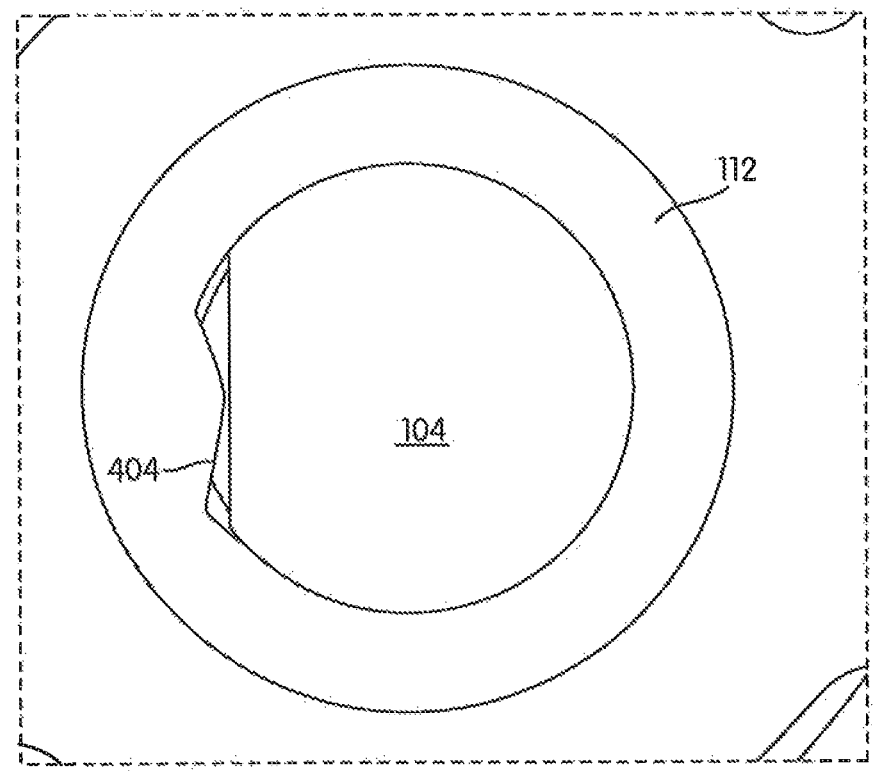
Figure 10:
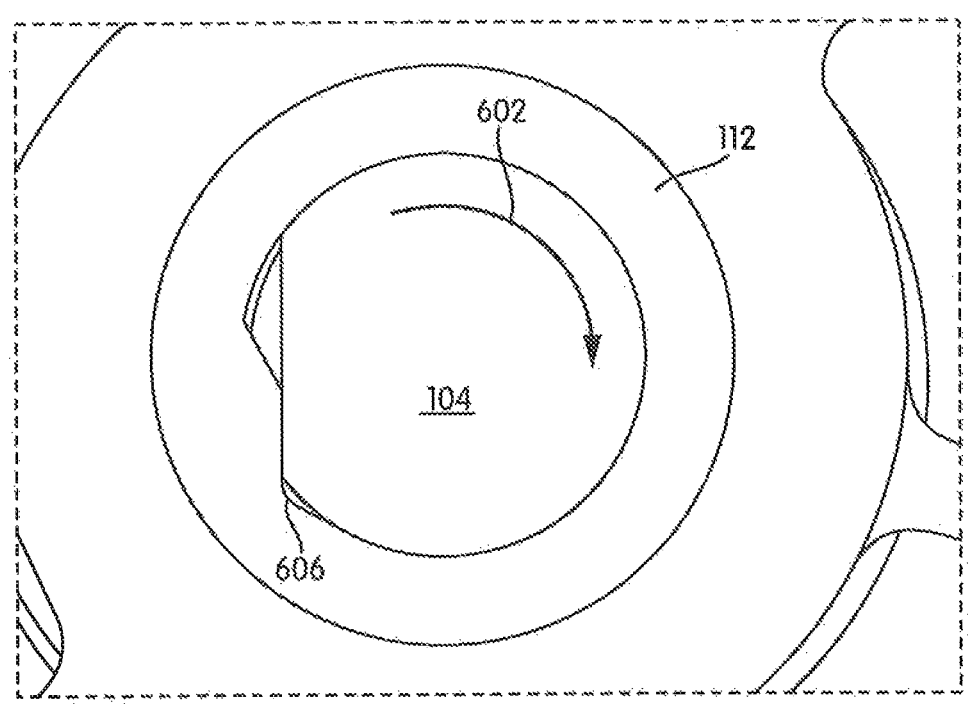

As shown in FIGS. 5, 6, and 10, the filter element 102 is installed over the drive shaft 104. The flat section 302 interacts with the sleeve projection 404 to provide a drive interface between the drive shaft 104 and the filter element sleeve 112. The sleeve projection 404 provides a raised planar face that makes surface area contact (as opposed to a point or line contact) with the flat section 302 of the drive shaft 104 when the drive shaft 104 applies torque to the filter element 102. Accordingly, when the drive shaft 104 rotates in the direction of arrow 602, the filter element 102 also rotates in the direction of arrow 602. As shown in FIG. 9, in some arrangements or rotational orientations of the filter element 102, there is clearance between the flat section 302 and the mating flat drive surface of the sleeve projection 404. These surfaces (i.e., the flat section 302 and the mating flat drive surface of the sleeve projection 404) may only be in contact when they are parallel when the drive shaft 104 rotates up to the flat surface of the sleeve projection 404.

Figure 8:
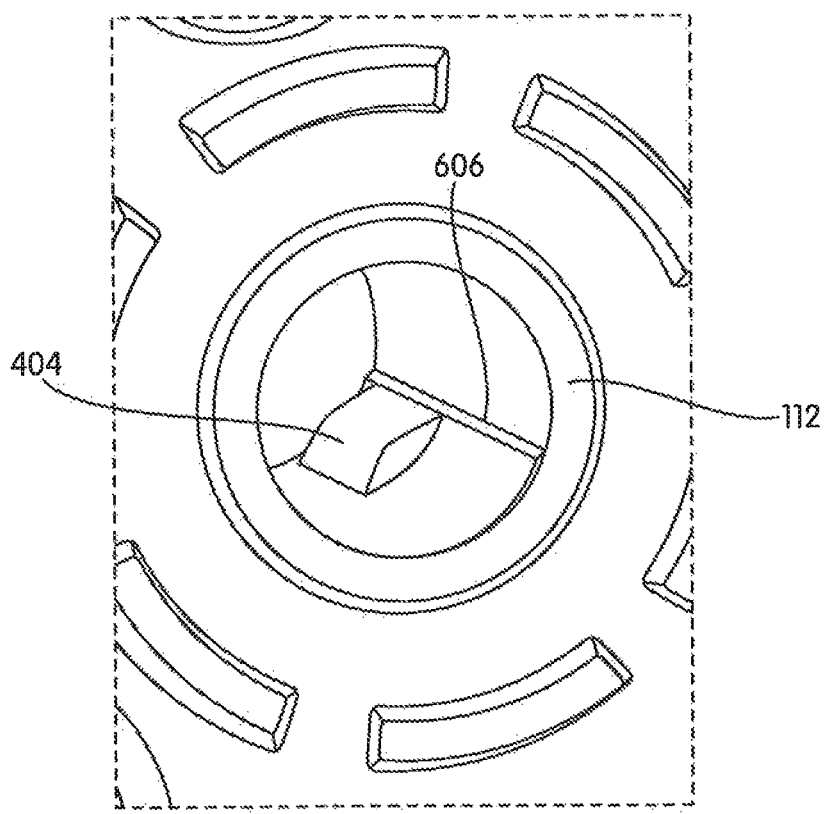

In some arrangements, the drive shaft 104 includes a chamfer 604 adjacent the flat section 302, which provides a relief or clearance to the root radius of the sleeve projection 404. In some arrangements, the filter element sleeve 112 includes a relief section 606 adjacent to the sleeve projection. The relief section 606 also provides a radius on an inside corner of the sleeve projection 404, which reduces the stress on the sleeve projection 404 during operation. The chamfer 604 and the relief section 606 are shown in more detail in FIGS. 4 and 5. As shown in FIG. 8, the relief section 606 extends an entire axial length of the filter element sleeve 112. However, the sleeve projection 404 does not extend the entire axial length of the filter element sleeve 112 in order to permit an axial portion of the drive shaft 104 that is not milled flat to engage with an upper portion of the filter element sleeve 112 (e.g., as shown in FIG. 2) to limit axial movement of the filter element 102 with respect to the drive shaft 104. Additionally, the relief section 606 in the filter element sleeve 112 and carve-outs where the drive shaft 104 meets the round part of the filter element sleeve 112 (i.e., the base of the filter element sleeve 112) form "debris pockets" when viewed from the top of the filter element 102. These debris pockets can accumulate debris thereby preventing migration of wear particles, for example debris originating from the coil spring 1304 above the element (as shown in FIGS. 13 and 14).

In other arrangements, the filter element sleeve 112 includes a relief section 606, while the drive shaft 104 does not include a chamfer 604. This arrangement is shown in FIGS. 9 and 10. In such arrangements, there is clearance between the drive shaft 104 and the filter element sleeve 112 during installation of the filter element 102 and no clearance when the drive shaft 104 rotates into the flat section of the sleeve projection 404 during operation.

Figure 7:
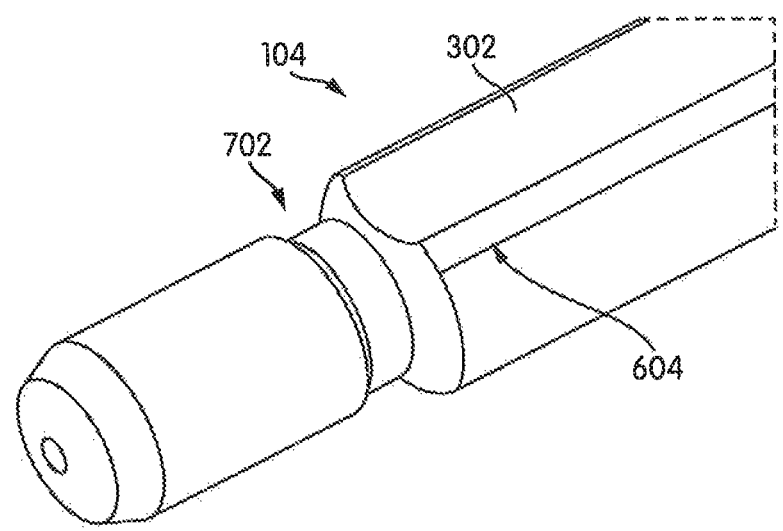
Figure 11:
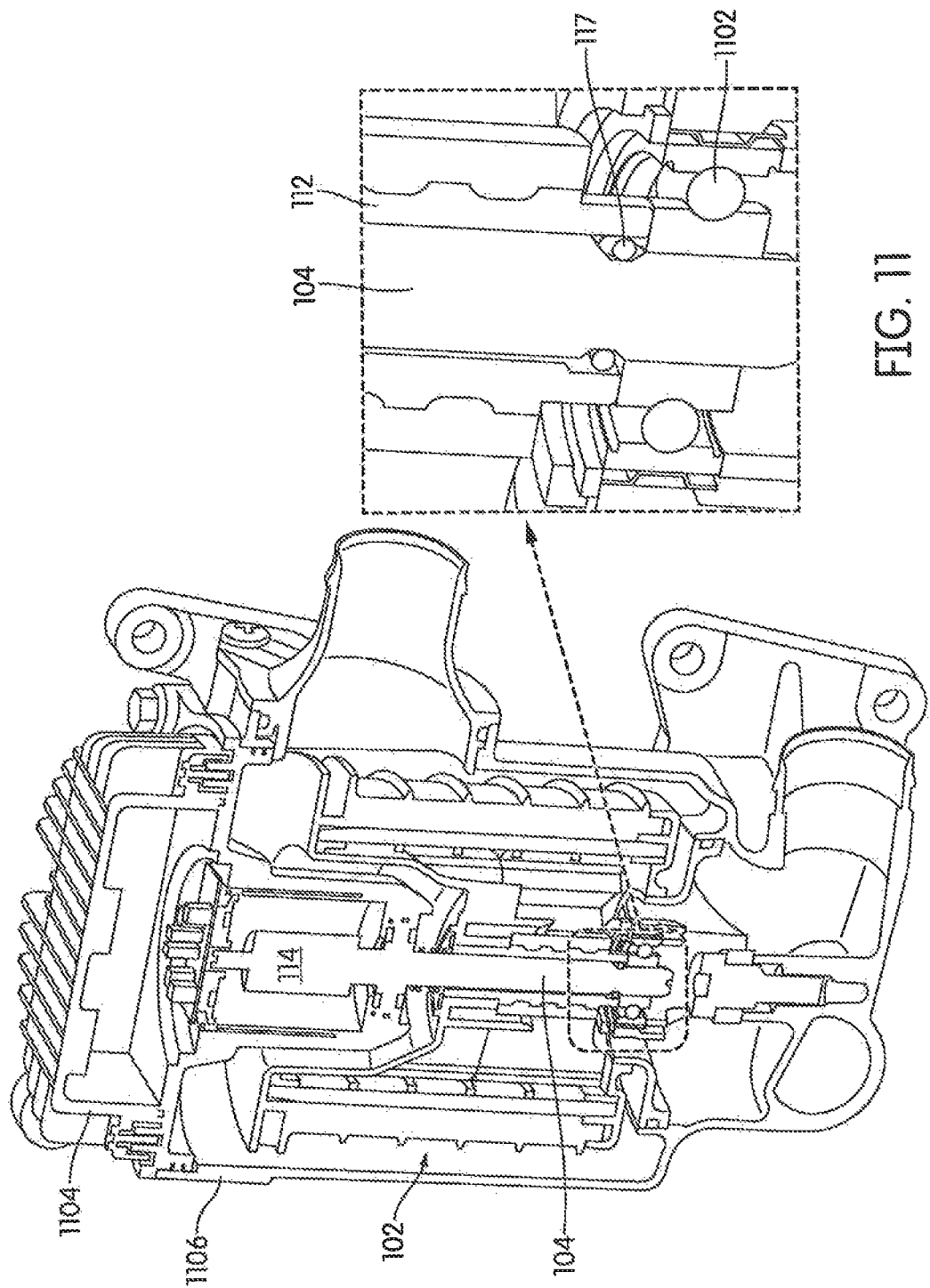
FIGS. 11 through 14 show various cross-sectional views of the filter element of FIG. 1 attached to the drive shaft and filter element positioning during service operations.
Figure 12:
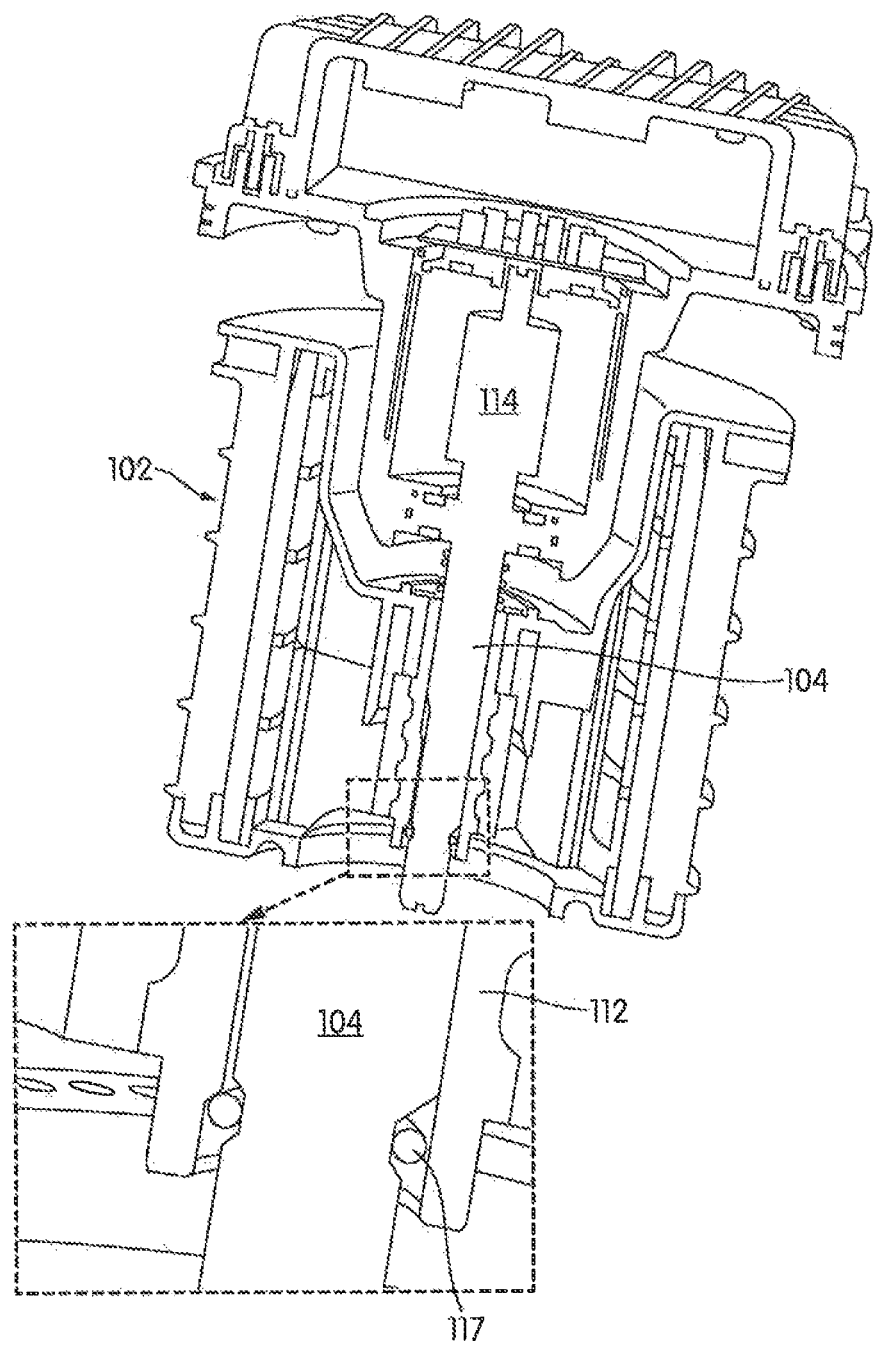
Figure 13:
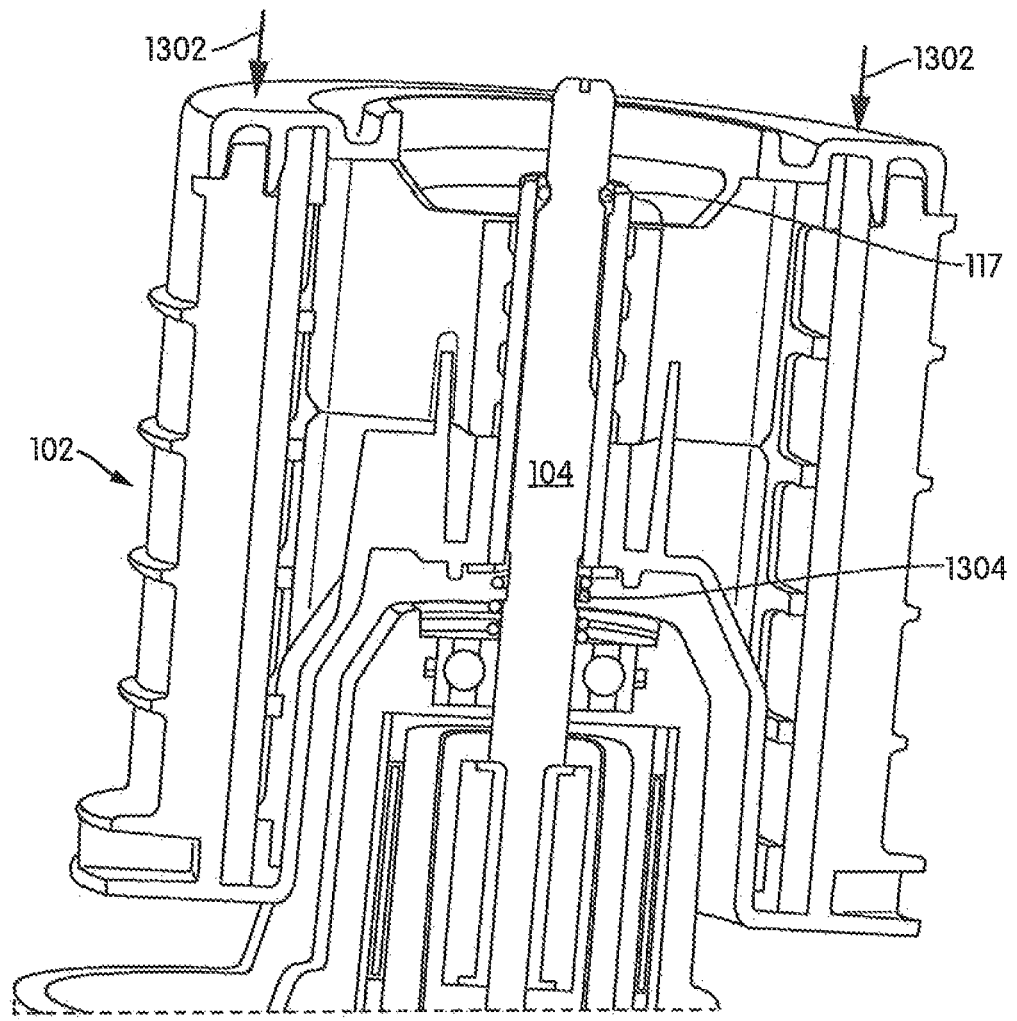
Figure 14:
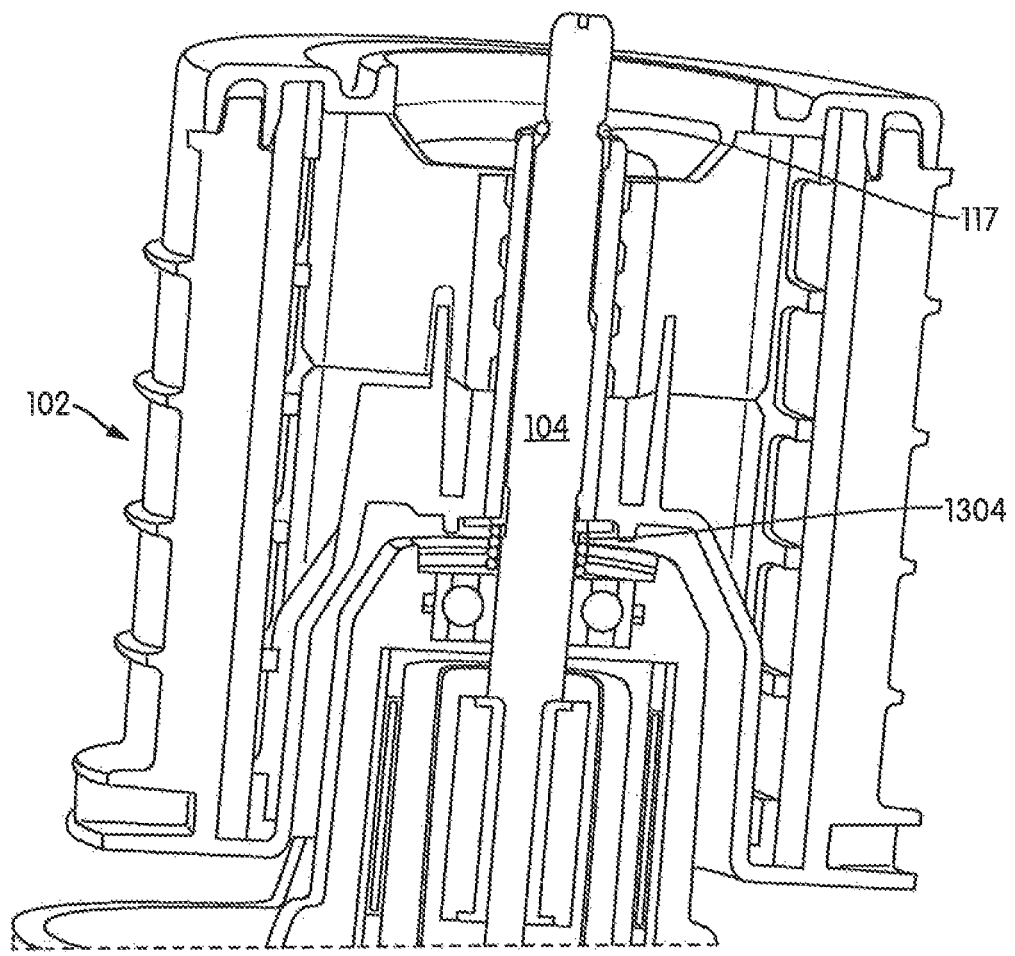

Referring to FIGS. 11 through 14, various cross-sectional views of the filter element 102 are shown. Specifically, FIG. 11 shows the filter element 102 installed over the drive shaft 104. The o-ring 117 fits between the drive shaft 104 and the filter element sleeve 112. The o-ring is placed in a necked down portion 702 of the drive shaft 104 (as shown in FIG. 7). When the filter element 102 is in the installed position (as shown in FIG. 11), the o-ring 117 is adjacent to a bearing 1102 that receives a free end of the drive shaft 104. The o-ring 117 generates friction between the drive shaft 104 and the filter element 102 that keeps the filter element 102 from falling off the drive shaft 104 during installation and service (e.g., when the top cover 1104 or filter element 102 is lifted from the housing 1106 as shown in FIG. 11) or placed back down into the housing 1106. Additionally, installing the o-ring 117 over the drive shaft 104 does not require a special tool. When the filter element 102 is being installed over the drive shaft, the filter element 102 is pressed over the drive shaft 104 in the direction of arrows 1302 (e.g., as shown in FIG. 13). This compresses the coil spring 1304 and exposes the groove for the o-ring (e.g., as shown in FIG. 14) on the drive shaft 104 such that the o-ring 116 can be installed on the drive shaft, which retains the filter element 102 on the drive shaft 104 in the axial direction. The o-ring 117 is trapped in a free state (as shown in FIG. 13) when the filter element 102 is in the installed position. The o-ring 117 helps prevent wear debris from getting into the bearing 1102. Additionally, the o-ring 117 forms a seal between the filter element sleeve 112 and the drive shaft 104, thereby preventing gases from bypassing the filter element through the openings between the drive features of the filter element sleeve 112 and the drive shaft 104.

While in the installed position, a coil spring 1304 surrounding the drive shaft 104 (or other form of biasing member) is in a first state. The coil spring 1304 is pre-assembled to the drive shaft 104 such that the top of the coil spring 1304 contacts the inner race of the motor bearing and is retained to the drive shaft 104 in the axial direction with a retaining e-clip that interacts with a groove on the drive shaft 104. In the first state, the retaining e-clip comes into contact with the second endcap 110 and the top of the filter element sleeve 112. To remove or service the o-ring 117, the filter element 102 can be pressed along direction of arrows 1302 (e.g., as shown in FIG. 13) past the installed position to expose the o-ring 117, which is shown in FIG. 14. In such a position, the coil spring 1304 is in a second state. While in the second state, the coil spring 1304 is more compressed than in the first state. In the second state, the retaining e-clip of the coil spring 1304 abuts the second endcap 110 and biases the filter element back to the installed position of FIG. 13.

Figure 15:
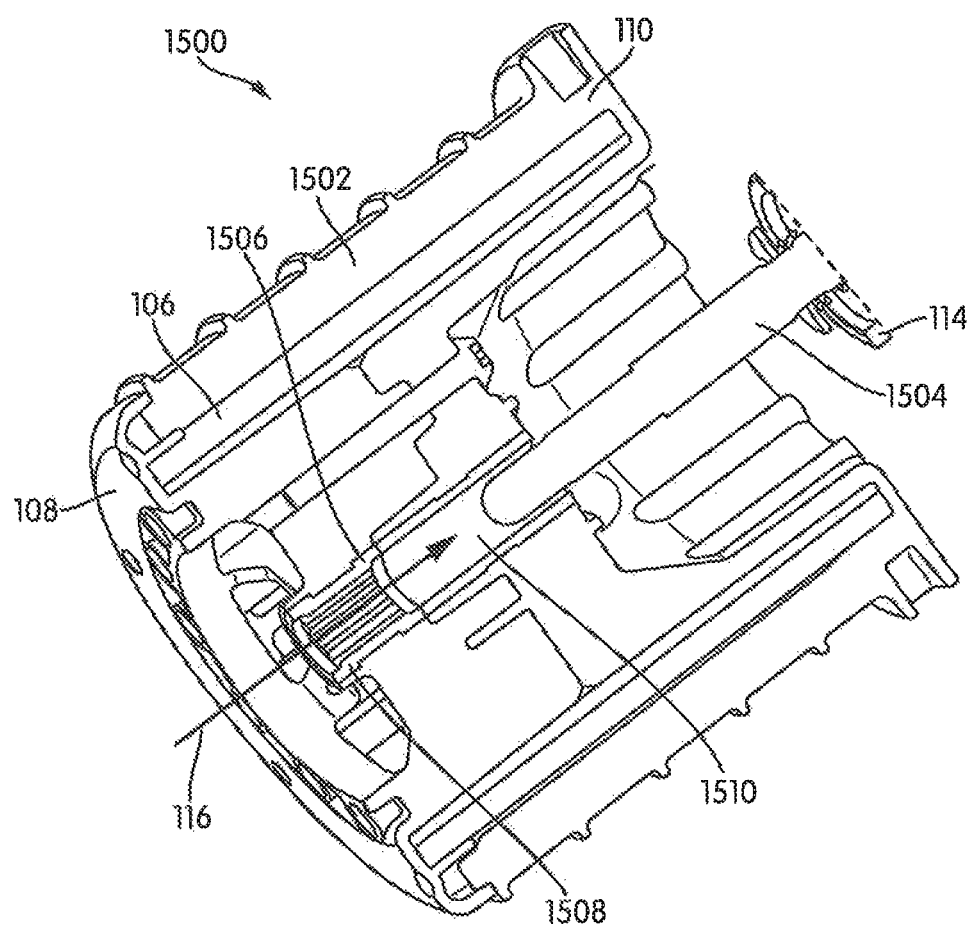
FIG. 15 shows a cross-sectional view of a filter element being installed over the drive shaft according to another example embodiment.
Figure 16:
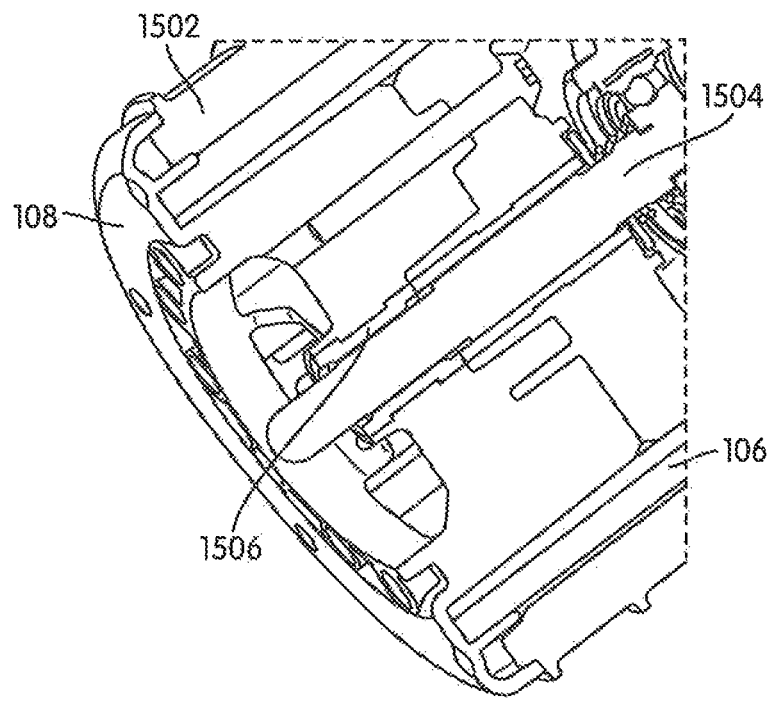
FIG. 16 shows a cross-sectional view of the filter element of FIG. 15 installed over the drive shaft.
Figure 17:
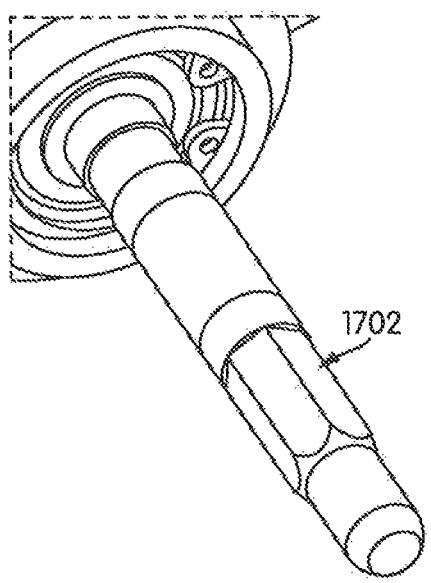
FIG. 17 shows a perspective view of the drive shaft of FIG. 15.
Figure 18:
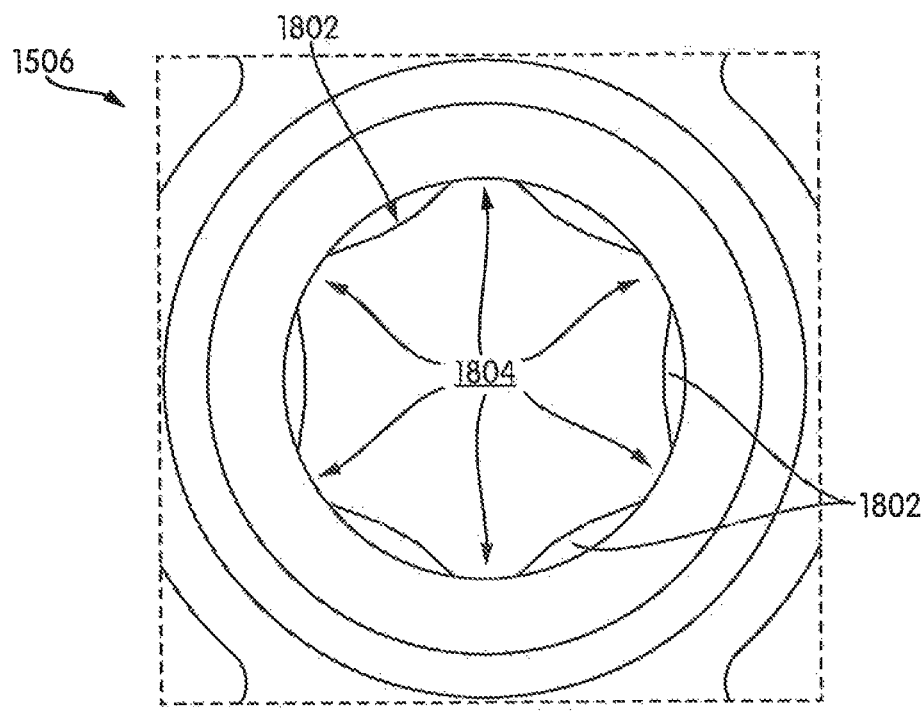
FIG. 18 shows a top-view of a filter element sleeve of the filter element of FIG. 15.
Figure 19:
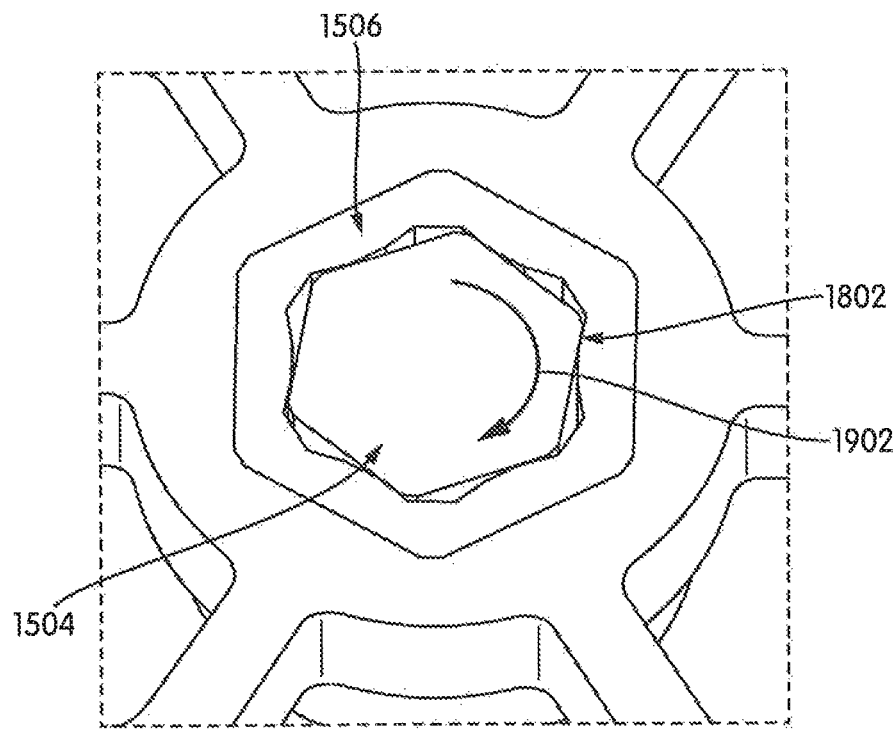
FIGS. 19, 20, and 21 each show views of the drive shaft interacting with the filter element sleeve of the filter element of FIG. 15.
Figure 20:
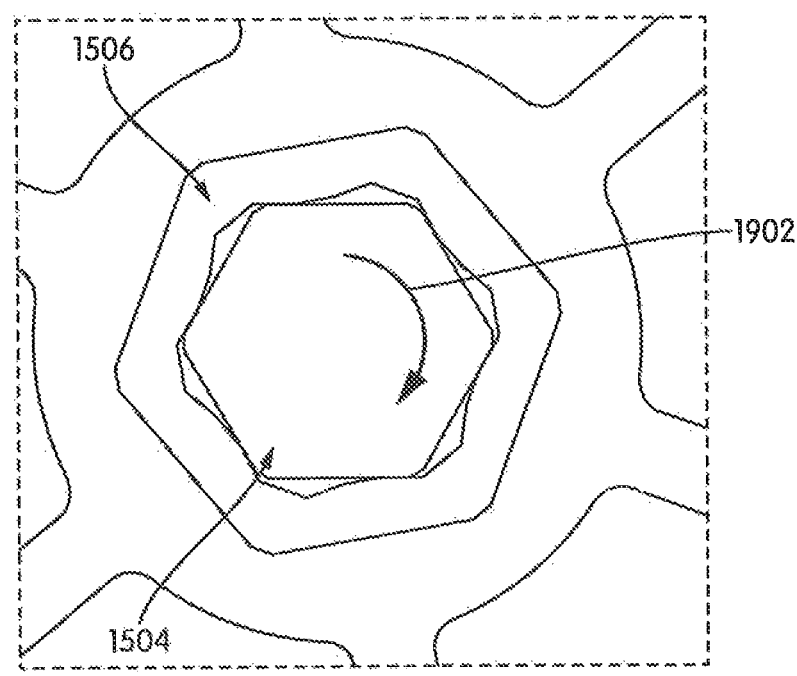
Figure 21:
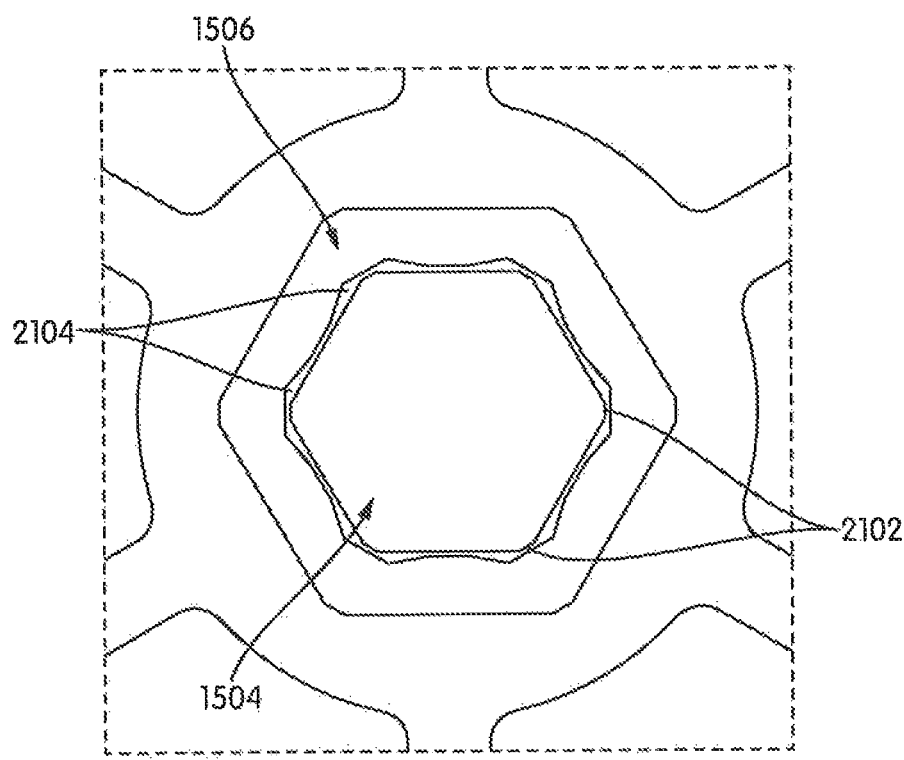

Referring to FIGS. 15 through 21, a filtration system 1500 having a filter element 1502 and a drive shaft 1504 is shown according to an example embodiment. FIG. 15 shows a cross-sectional view of the filter element 1502 being installed over the drive shaft 1504. FIG. 16 shows a cross-sectional view of the filter element 1502 installed over the drive shaft 1504. FIG. 17 shows a perspective view of the drive shaft 1504. FIG. 18 shows a top-view of a filter element sleeve 1506 of the filter element 1502. FIGS. 19, 20, and 21 each show views of the drive shaft 1504 interacting with the filter element sleeve 1506.

The filter element 1502 and the drive shaft 1504 are similar to the filter element 102 and drive shaft 104 of FIGS. 1 through 14. Accordingly, like numbering is used to designate like components between FIGS. 1 through 14 and FIGS. 15 through 21. As shown best in FIGS. 15 and 16, the filter element 1502 includes filter media 106 arranged between first and second endcaps 108 and 110. The filter element 1502 includes a filter element sleeve 1506 that is configured to receive and surround the drive shaft 104. In some arrangements, the filter element sleeve 1506 is a bushing. The drive shaft 1504 is rotated by a drive mechanism, such as an electric motor 114. During installation, the filter element 1502 is inserted over the drive shaft 1504 in the direction of arrow 116.

As shown in FIG. 17 the drive shaft 1504 includes a drive section 1702. The drive section 1702 includes a plurality of flat faces that form a hexagonal cross-section at the drive section 1702 of the drive shaft 1504. As described in further detail below, the flat faces of the drive section 1702 provide drive surfaces that interact with a mating surfaces of the filter element sleeve 1506 to impart rotation from the drive shaft 1504 to the filter element 1502 (e.g., as shown in FIGS. 19 and 20). In alternate arrangements, the drive section 1702 of the drive shaft 1504 can include any combination of drive surfaces (e.g., flat or angled surfaces), projections, and/or keyways that interact with the filter element sleeve 1506 to impart rotation from the drive shaft 1504 to the filter element 1502.

The filter element sleeve 1506 is sized and shaped to receive the drive shaft 1504. As shown best in FIG. 18, the filter element sleeve 1506 includes a plurality of projections 1802 on an inner surface of the filter element sleeve 1506. The plurality of projections 1802 comprise radially inward projecting bumps that interact with the flat faces of the drive section 1702 of the drive shaft 1504 to transfer rotation from the drive shaft 1504 to the filter element 1502 (e.g., as shown in FIGS. 19 and 20). In some arrangements, there are six equally sized and evenly spaced projections 1802 (e.g., as shown in FIG. 18) that form a hexalobular keyway 1804 to receive the drive shaft 1504. In alternative arrangements, the filter element sleeve 1506 may include any combination of drive surfaces (e.g., flat or angled surfaces), projections, and/or keyways that interact with the drive shaft 1504 to impart rotation from the drive shaft 1504 to the filter element 1502.

As shown in FIGS. 19, 20, and 21, when the filter element 1502 is installed over the drive shaft 1504, the drive shaft 1504 is received within the filter element sleeve 1506. The flat faces of the drive section 1702 interact with the projections 1802 to provide a drive interface between the drive shaft 1504 and the filter element sleeve 1506. The projections 1802 provide raised planar faces that make surface area contact (as opposed to a point or line contact) with the flat faces of the drive section 1702 of the drive shaft 1504 when the drive shaft 1504 applies torque to the filter element 1502. Accordingly, when the drive shaft 1504 rotates in the direction of arrow 1902, the filter element 1502 also rotates in the direction of arrow 1902. Additionally, since the drive shaft 1504 and the filter element sleeve 1506 are symmetrical, the drive shaft 1504 and the filter element 1502 can be rotated in either direction (i.e., clockwise or counter clockwise) without sacrificing drive surface contact area. As shown in FIG. 21, in some arrangements or rotational orientations of the filter element 1502, there is clearance between the flat faces of the drive section 1702 and the mating flat drive surfaces of the projections 1802. These surfaces (i.e., the flat faces of the drive section 1702 and the mating flat drive surfaces of the projections 1802) may only be in contact when they are parallel when the drive shaft 1504 rotates up to the flat surface of the projection 1802.

In some arrangements, the drive section 1702 of the drive shaft 1504 includes rounded or chamfered edges 2102 connecting adjacent flat faces, which provides a relief or clearance to the root radius of the projections 1802. In some arrangements, the filter element sleeve 1506 includes relief sections 2104 positioned between adjacent projections 1802. The relief sections 2104 also provide a radius on an inside corner of the projections 1802, which reduces the stress on the projections 1802 during operation. The rounded or chamfered edges 2102 and the relief sections 2104 are shown in more detail in FIG. 21. As shown best in FIG. 15, the sleeve projections 1802 do not extend the entire axial length of the filter element sleeve 1506 in order to permit an axial portion of the drive shaft 1504 that is not milled flat to engage with an upper portion of the filter element sleeve 1506 (e.g., as shown in FIG. 16) to limit axial movement of the filter element 1502 with respect to the drive shaft 1504. The axial portion of the drive shaft 1504 that is not milled flat to engage with the upper portion of the filter element sleeve 1506 improves radial stability due to the tight clearance between the drive shaft 1504 and the filter element sleeve 1506, which reduces vibration and excess wear or risk of failure of the filter element sleeve 1506 and/or the drive shaft 1504. In some arrangements, the filter element sleeve 1506 is a two sleeve design (e.g., as shown best in FIG. 15) that includes a drive portion 1508 having the plurality of projections 1802 and a running sleeve portion or bushing portion 1510 that is a precision cylindrical surface. In such arrangements, the two sleeve designs may improve manufacturability of the filter element sleeve 1506. Additionally, the relief section 2104 in the filter element sleeve 1506 and carve-outs where the drive shaft 1504 meets the round part of the filter element sleeve 1506 (i.e., the base of the filter element sleeve 1506) form "debris pockets" when viewed from the top of the filter element 1502. These debris pockets can accumulate debris thereby preventing migration of wear particles, for example debris originating from the coil spring 1304 above the element (e.g., in a similar manner as described above with respect to FIGS. 13 and 14). In other arrangements, the filter element sleeve 1506 includes relief sections 2104, while the drive shaft 1504 does not include chamfers 2102. In such arrangements, there is clearance between the drive shaft 1504 and the filter element sleeve 1506 during installation of the filter element 1502 and no clearance when the drive shaft 1504 rotates into the flat section of the projections 1802 during operation.

The above-described rotating filter elements and drive systems may be used in a variety of systems. For example, the above-described rotating filter elements and drive systems may be used in crankcase ventilation systems to separate oil and aerosol from crankcase blowby gases. Additionally, the above-described rotating filter elements and drive systems may be used in natural gas filtration to remove oil and aerosol from natural gas. The noted examples are intended to be non-limiting as the rotating filter elements and drive systems may be used in any suitable filtration systems.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filtration system, comprising:
   a housing having an inlet and an outlet;
   a drive mechanism including a drive shaft with a flat section;
   a rotating centrifugal separation device positioned within the housing and in fluid communication with the inlet and the outlet, the rotating centrifugal separation device configured to separate a suspended liquid from a fluid received through the inlet, the rotating filter element including a sleeve or bushing positioned within an interior space defined by the rotating centrifugal separation device and in receiving communication with the drive shaft, the sleeve or bushing having a projection that projects radially inward, the projection interacting with the flat section of the rotating shaft so as to transfer rotation from the rotating shaft to the rotating centrifugal separation device.

2. The filtration system of claim 1, wherein the projection includes a raised planar face that makes surface area contact with the flat section of the rotating shaft during rotation of the rotating shaft.

3. The filtration system of claim 1, wherein the sleeve or bushing includes a relief section that provides a radius on an inside corner of the projection.

4. The filtration system of claim 1, wherein the drive shaft includes a chamfer adjacent to the flat section.

5. The filtration system of claim 1, further comprising an o-ring positioned in a necked down portion of the drive shaft.

6. The filtration system of claim 1, wherein the rotating centrifugal separation device is a rotating coalescer.

7. The filtration system of claim 6, wherein the rotating coalescer comprises filter media, and wherein the sleeve or bushing is positioned within an interior space defined by the filter media.

8. The filtration system of claim 7, wherein the filter media is a fibrous filter media.

9. The filtration system of claim 1, wherein the fluid received through the inlet is crankcase blowby gas of an internal combustion engine, and wherein the suspended liquid includes oil or aerosol.

10. The filtration system of claim 1, wherein the drive shaft includes a chamfer adjacent to the flat section.

11. The filtration system of claim 1, further comprising a snap ring positioned in a necked down portion of the drive shaft.

12. The filtration system of claim 1, wherein the drive shaft comprises a plurality of flat sections including the flat section, the plurality of flat sections forming a hexagonal cross-sectional shape at a drive section of the drive shaft.

13. The filtration system of claim 12, wherein the drive shaft comprises a plurality of chamfers connecting adjacent flat sections of the plurality of flat sections.

14. The filtration system of claim 1, wherein the filter element sleeve or bushing comprises a plurality of projections including the projection, the plurality of projections forming a hexalobular keyway that receives a drive section of the drive shaft.

15. The filtration system of claim 14, wherein the filter element sleeve or bushing comprises a relief section positioned between each adjacent projection of the plurality of projections.

16. The filtration system of claim 1, wherein the filter element sleeve or bushing comprises a keyway that receives the drive section of the drive shaft.

17. A rotating centrifugal separation device comprising:
filter media; and
a sleeve or bushing positioned within an interior space defined by the filter media and configured to receive a drive shaft of a filtration system when the rotating filter element is installed in the filtration system, the sleeve or bushing having a projection that projects radially inward, the projection interacting with a rotating shaft of the filtration system so as to transfer rotation from the rotating shaft to the rotating filter element, the rotating filter element configured to separate a suspended liquid from a fluid.

18. The rotating centrifugal separation device of claim 17, wherein the filter element sleeve or bushing comprises a plurality of projections including the projection, the plurality of projections forming a hexalobular keyway that is configured to receive a drive section of the drive shaft.

19. The rotating centrifugal separation device of claim 17, wherein the projection comprises a raised planar face that makes surface area contact with a flat section of the rotating shaft during rotation of the rotating shaft.

20. The rotating centrifugal separation device of claim 17, wherein the sleeve or bushing comprises a relief section that provides a radius on an inside corner of the projection.

* * * * *